United States Patent
Rogers et al.

(10) Patent No.: US 8,428,056 B2
(45) Date of Patent: Apr. 23, 2013

(54) GENERATION OF REDUNDANT SCHEDULED NETWORK PATHS USING A BRANCH AND MERGE TECHNIQUE

(75) Inventors: Steven A. Rogers, Alton, NH (US); Howard C. Reith, Somersworth, NH (US); Dale J. Wisler, Atkinson, NH (US)

(73) Assignee: Avaya, Inc., Basking Ridge, NJ (US)

( * ) Notice: Subject to any disclaimer, the term of this patent is extended or adjusted under 35 U.S.C. 154(b) by 2340 days.

(21) Appl. No.: 10/286,013

(22) Filed: Nov. 1, 2002

(65) Prior Publication Data

US 2003/0048782 A1    Mar. 13, 2003

Related U.S. Application Data

(63) Continuation-in-part of application No. 09/746,744, filed on Dec. 22, 2000.

(60) Provisional application No. 60/344,448, filed on Nov. 1, 2001.

(51) Int. Cl.
*H04L 12/28* (2006.01)
*G01R 31/08* (2006.01)
*H04L 12/26* (2006.01)
*G06F 11/00* (2006.01)

(52) U.S. Cl.
USPC ........... 370/389; 370/218; 370/232; 370/253; 370/356; 714/4.1

(58) Field of Classification Search ................... 370/218, 370/221–228, 352, 400, 238, 242; 709/229, 709/226, 220, 221; 714/4
See application file for complete search history.

(56) References Cited

U.S. PATENT DOCUMENTS

| | | | | |
|---|---|---|---|---|
| 4,608,684 A | * | 8/1986 | Upp | 370/368 |
| 5,365,521 A | * | 11/1994 | Ohnishi et al. | 370/352 |
| 5,671,215 A | * | 9/1997 | Foglar | 370/227 |

(Continued)

OTHER PUBLICATIONS

Integral Access, "Products/Solutions: PurePacket(tm) FAQs", http://www.integralaccess.com/products_faqs.htm, viewed Jan. 28, 2003.

(Continued)

*Primary Examiner* — Ian N Moore
*Assistant Examiner* — Kiet Tang
(74) *Attorney, Agent, or Firm* — Anderson Gorecki & Rouille LLP

(57) ABSTRACT

A method and apparatus for creating and using multiple redundant paths between endpoints in a scheduled communication network, and for sending copies of data down each path. A path calculation is made for one or more redundant paths between designated branch and merge points in a network using scheduled switch/routers, and duplicate packets are transmitted along each path to the merge point. The first packet received among the configured paths at the merge point is forwarded to a resulting data stream and the later (duplicate) copies from other paths are discarded. Path itineraries are configured to maintain temporal packet sequence in the resulting stream. Path status is monitored and additional paths can be substituted if a path has an outage. Alternatively, multiple divergent paths can be configured, and duplicate packets transmitted along each path, where at least one path delivers data between end points, and a monitoring path also transmits copies of the data to an alternate location. A new routing header may be attached to packets transmitted in the monitoring path, to facilitate conformance with CALEA monitoring requirements.

12 Claims, 7 Drawing Sheets

U.S. PATENT DOCUMENTS

| | | | |
|---|---|---|---|
| 5,793,745 A | | 8/1998 | Manchester |
| 5,838,924 A | | 11/1998 | Anderson et al. |
| 6,026,442 A | | 2/2000 | Lewis et al. |
| 6,046,832 A | | 4/2000 | Fishman |
| 6,075,766 A | | 6/2000 | Croslin |
| 6,141,325 A | * | 10/2000 | Gerstel .......................... 370/238 |
| 6,466,574 B1 | * | 10/2002 | Fujisaki et al. ................ 370/218 |
| 6,741,570 B1 | * | 5/2004 | Kojima ........................ 370/253 |
| 6,751,746 B1 | * | 6/2004 | Jain et al. ........................... 714/4 |
| 2001/0036181 A1 | | 11/2001 | Rogers |
| 2002/0191592 A1 | | 12/2002 | Rogers |

OTHER PUBLICATIONS

Integral Access, "Products/Solutions: The PurePacketNode (PPN)", http://www.integralaccess.com/products_node.htm, viewed Jan. 28, 2003.

American National Standards Institute (ANSI), "TIA/EIA-J-STD-025 Lawfully Authorized Electronic Surveillance," Sep. 7, 2000, pp. 13-41.

Cable Television Laboratories, "PacketCable (tm) Electronic Surveillance Specification," Dec 12, 1999, pp. 1-40.

* cited by examiner

GENERATION OF REDUNDANT SCHEDULED NETWORK PATHS USING A BRANCH AND MERGE TECHNIQUE

CROSS REFERENCE TO RELATED APPLICATIONS

This application is a continuation in part of U.S. patent application Ser. No. 09/746,744, entitled "NETWORK SWITCH WITH PACKET SCHEDULING," filed on Dec. 22, 2000, which is incorporated by reference herein in its entirety ("the co-pending '744 application"). This application claims priority under 35 USC §119(e) to provisional application Ser. No. 60/344,448, entitled "GENERATION OF REDUNDANT SCHEDULED NETWORK PATHS USING A BRANCH AND MERGE TECHNIQUE," filed on Nov. 1, 2001, which is hereby incorporated by reference herein in its entirety. The present application is also related to U.S. patent application Ser. No. 10/162,454, "REAL-TIME NETWORK SCHEDULED PACKET ROUTING SYSTEM", filed 4 Jun. 2002, which is hereby incorporated by reference in its entirety ("the co-pending '454 application).

FIELD OF THE INVENTION

The present invention relates generally to fault tolerant data networking and specifically the implementation of a mechanism to generate a redundant network path for packet data in real time and without delaying or in any way affecting the original transport of packet data through a network implemented with scheduled switch/routers.

BACKGROUND OF THE INVENTION

Data communication networks must be sufficiently reliable to satisfy the needs of their users, or risk obsolescence. Where valuable information or high-quality transmissions are concerned, automatic backup systems are often deployed for detecting problems and providing alternate means for delivery of the information. System designers and operators are, however, constrained by various factors such as system cost, reliability/supportability, delay, and efficiency.

For fault tolerance, redundant (duplicate) hardware is the traditional manner in which a system, with a plurality of interdependent and independent subsystems, is designed to achieve tolerance to failures of all types. It is generally known by those skilled in the art that tolerance of failures cannot be achieved without some form of subsystem redundancy. In addition, redundancy alone cannot provide fault tolerance unless the hardware is designed such that the "state" of the current operation is maintained in the presence of a failure. This is particularly true of, but not limited to software controlled electronic subsystems.

Over the past thirty-five years, several types of fault tolerant architectures have been developed by the computer and telecommunications industries. All of these architectures use dual or in some cases, triple redundancy as the basis for fault tolerance.

Those skilled in the art also understand that complex electronic systems are commonly made up of a number of interdependent subsystems and that the operational integrity of the total system depends upon the operational integrity of each of the subsystems.

Operational availability is the probability that a system will be operational during the required period, i.e., the system has not gone down, or if it went down, it has been repaired. Operational availability is calculated using the following equation:

$$A = MTBF/(MTBF + \text{downtime})$$

Where: A is the Operational Availability, MTBF is the mean time between failures, and downtime is the mean repair time.

For a total system to be "available" for use, each of the required subsystems must also be available when needed. Contrary to this however, only one of the required subsystems need fail to cause the total system to also fail. Thus, the availability of a system made up of two subsystems can be represented by the probability that both subsystems (A and B) are operational at the same time. From statistics, we can represent this as a joint probability:

$$P(AB) = P(A) \times P(B)$$

Where A and B are two independent events.

The probability that the system is unavailable at a given time is:

$$\text{Unavailability} = 1 - \text{Availability}$$

The above shows that the probability of both A and B being fully operational at the same time is equal to the probability of A times the probability of B. As a typical example, assume A and B are each 99% available on a yearly basis (meaning an outage during 1% of a single year) then:

$$P(AB) = P(A) \times P(B)$$

$$P(AB) = 0.99 \times 0.99 = 0.9801$$

Note that there is a slight loss of availability with this configuration. However, as the complexity of a system increases, the availability drops off rapidly. Assuming a reliability factor of 0.99 for each required link (L) in a system with six links, the predicted availability would be:

$$P(L) = L^6 = 0.94148 \, (94.1\%)$$

An availability of 0.94148 results in an unavailability of (1−availability), or 0.05852 (5.9%). These figures are far below the 99.999 percent availability ("five nines") required for high-reliability systems. Note that the probability model assumes that the "success" events (meaning availability) for each link are independent of all other links. Should there be any common single point of failure between any two or more links, the reliability would be further diminished.

Where multiple components are available to perform a function in parallel, a different analysis is required. Rather than a single component failure bringing down the system as above, the availability factor of such a system is derived from the joint probability of failure all of the redundant subsystems. Each redundant subsystem may have many components, and each required component has an availability factor, as described above.

However, where multiple subsystems are available in parallel, the probability of system failure is the joint probability of the multiple paths experiencing a failure at the same time. For example, if there are two subsystems as described above, either of which is capable of delivering the required service, the system availability is calculated as:

$$\text{Probability of Failure} = 0.05852 \times 0.05852 = 0.0034$$

$$\text{Availability} = 1 - 0.0034 = 99.66\%$$

Thus, by using an additional redundant subsystem to supplement the original subsystem, the availability of the overall system has been increased from 94.1% to nearly 99.7%. This is a reduction from over 21 days of unavailability during the course of a year to just 1.24 days of unavailability—a reduction in downtime of 94.2%. Of course, the cost of building the redundant system is at least doubled because there are twice as many components. Furthermore, because of the additional components that could independently fail, the system MTBF will be diminished, and the support costs increased. However, this significant increase in system availability is worth the additional expense for many applications.

Adding network redundancy is a function of making tradeoffs between system cost (including maintenance) and overall performance. It must also be a function of the type of end devices that will be making use of the switching network. To design a highly reliable communication system requires not only redundancy of the network path but also highly reliable end devices. Each end device must also have a backup connection to the network, further increasing the component count and costs.

High-reliability systems typically include those designed for "fault tolerance," failover (or "hot standby") systems, "fault resilient," or other backup provisions. The inherent reliability of each component, and the system architecture will dictate the expected availability.

For example, a "fault resilient" system may have an architecture in which the least reliable components have redundant parts, but the controller remains a single point of failure. The designer then rests system availability upon the fact that the controller is made of highly reliable, solid-state components. An example is the so-called RAID system or Redundant Arrays of Independent Disks, wherein multiple mechanical disks are configured for redundant storage but the central controller is not always fully redundant.

Another type of architecture, the "failover" design, uses a standby design where a backup system (the hot standby) is engaged only when the primary part of the system fails. Of course, the hot standby may be just as likely to fail as the primary system, so designers might include multiple standby systems, based upon the theory that at least one system will be working. A good example of this type of design is a configuration of two or more computer systems with software that is able to switch to another computer whenever one of the systems fails. This type of configuration is called a "cluster", a term defined by Digital Equipment Corporation when they introduced the first VAX Clusters to the market in the early 1980's. The biggest problem with this type of design is that it is impossible to maintain "state" when one of the systems fails. The failover therefore usually involves a program restart, causing loss of time if not data. Note that RAID systems can also be operated in clusters, thus obtaining the overlapping reliability advantages of each architecture, but at a higher cost.

A true fault tolerant architecture uses a design that synchronizes, usually at the instruction or operation level, each of two or more systems. Synchronized redundant systems are the only way to achieve the preservation of "state" when a failure occurs, overcoming the primary weakness of failover systems.

Increased availability with redundant hardware as described above does not generally increase system performance, but does increase system cost. In fact, a true fault tolerant system may impose a 10 to 20% overhead on a system due to the extensive checking and latencies caused by the fault detection, reporting, and isolation mechanisms. Fault Tolerant computers usually cost three or more times what a non-fault-tolerant computer would cost, and would have less performance.

Despite the cost and performance penalties of traditional redundant architectures, true fault tolerance is necessary for the most demanding mission critical or business critical applications. There are many applications in many industries where the cost of downtime can reach over $1 million per hour, or where an outage could result in personal injury. These environments demand "24 by 7" availability of their systems and strict adherence to accepted standards of reliability. "Systems" in this context is more than a server, as it makes no sense to have a fault tolerant server without a fault tolerant network as well as a support organization with the experience, tools and training to manage a fault tolerant environment.

When defining "fault tolerance" for a communication system, one must naturally include all required elements from end to end. However, some system vendors overlook the fallibilities of the single-ended devices (SEDs) connected at each end of the system. Historically, analysis of a telephone system reliability omitted consideration of the telephone itself, under the presumption that a user who lost a connection would use another telephone, if necessary, and re-dial. All that was required was that the system would offer a fresh dial tone and carry the re-established connection. In this age of non-stop computer communication, the availability of the end point devices must also be considered, as well as multiple communication paths between the core system and the connected devices.

Even considering all of the essential subsystems necessary for end-to-end communication, the vast majority of network switches and routers continue to utilize hot standby technology or fault resiliency to increase availability. Standby fault tolerance however, is a post-failure, reactive technology that attempts to minimize downtime by switching in a backup system. If state is lost, an application restart must be initiated. In reality, standby redundancy does not tolerate faults, although it can minimize their effects.

Additionally, existing network switches and routers are particularly inefficient in terms of utilizing the additional redundant circuitry. Being insensitive to the characteristics of the end device, existing switching technology cannot provide redundancy "on demand" nor can it release the redundant circuitry after use. This proves to be a serious cost burden to those users that do not require continuously provisioned fault tolerance. Such users may prefer instead to use the additional resources for increased bandwidth (performance).

Existing approaches to fault tolerant networking systems typically require full-time, dedicated resources for each end device and each network device, and must be specifically provisioned in the network and interface devices for the purpose. Network designers and subscribers must identify and plan for each new redundancy requirement in each location and device, and must define how they will be connected to each other. Such configurations are typically static and difficult to change. For example, a high-reliability computer must have multiple network interfaces configured and installed, connecting to multiple network ports, each configured as hot standby or load-balanced for backup, and all communication equipment and circuits in each path must be duplicated. Furthermore, circuits, interfaces and resources of each system along the route between computers must often be individually "hardened" with their respective backup facilities, so that they are available if any fault-tolerant services are to be provided. This results in a tremendous waste of resources and bandwidth that are under-utilized (or completely unused) until a fault-tolerant processor is connected, and a fault occurs.

In some cases of failover, data may be duplicated and transmitted over disparate paths, usually as a transient condition during failover, as systems attempt to retransmit over a failed link. A receiver in such a system is burdened with the task of distinguishing valid data from erroneously duplicated data. Typically such a system will rely upon the fact that each packet has a time to live before being discarded, or a predetermined sequence number, or other higher-level error detection criteria. These solutions are error-prone at best, and can result in unstable transmissions while the system attempts to recover.

Those skilled in the art will observe that the implementation of redundant paths within a complex network topology will be inherently burdened with the problem of resolving phasing errors between multiple copies of the same datagram arriving at the same end point at different times. From a design and implementation viewpoint, many problems with resolving phasing and sequence errors can be solved with data storage buffers. While such mechanism may provide the designer of such a system with a mechanism to sort and align data packets in sequence, the buffers add yet another set of problems such as excessive cost and added latency delays. In addition, since the network systems do not perform the functions of phasing and sequence alignment, nor does it filter redundant packets, it is up to the end device to perform these functions, increasing processing and communications burdens on that device.

New opportunities have also arisen for beneficial use of redundant network paths. In October 1994, Congress took action to protect public safety and national security by enacting the Communications Assistance for Law Enforcement Act (CALEA) Public Law 103-414. The law clarifies and further defines the existing statutory obligation of providers of telecommunications services in assisting law enforcement in executing electronic surveillance court orders. Specifically, CALEA directs the telecommunications industry to design, develop, and deploy solutions that meet specific assistance capability requirements for conducting lawfully authorized wiretaps. The service providers must not only deliver call identification information, but also deliver real-time intercepted content in a format that can be transmitted to the designated law enforcement agency (LEA).

In the absence of firm technical standards for CALEA compliance by each type of communication system, the Telecommunications Industry Association proposed an interim standard in the late 1990's, TIA/EIA-J-STD-025, which provides guidelines for messages and protocols to be used, including packet-mode surveillance. Generally, copies of all call content and call identification packets, to and from the surveillance subject, must be collected and retransmitted to the LEA. Multiple simultaneous surveillance targets and multiple LEAs are envisioned, further increasing complexity and generating further data traffic.

In particular, copies of information packets sent or received by the surveillance subject must be timely forwarded to an LEA collection point without having been modified or interpreted, although they may be re-packaged and labeled for LEA delivery. The interim standard recognizes that network congestion may result in loss of collected call data when store-and-forward resources are limited. Adopting the industry concept of "lossy protocols", the standard simply notes that dedicated circuits should be used where content delay or loss cannot be tolerated. Thus, CALEA implementation will require, as a minimum, redundant copies of packet data streams, to be delivered in real time. No known system presently has an efficient means for providing this specialized service.

BRIEF SUMMARY OF THE INVENTION

To enhance the reliability of a communication network connection, an illustrative embodiment of the Branch and Merge invention disclosed herein is engaged to construct a high-reliability path comprising one or more redundant paths between two end devices such as packet telephones using a scheduled packet network.

Referring to FIG. 1, a user's phone device 300 is connected to a switching system incorporating the invention configured to provide high-reliability end-to-end service between callers and destinations. The switching system is comprised of one or more scheduled switch/routers (SSRs), implemented in accord with the invention-described in the co-pending '744 application. Through the use of the SSRs, the network establishes end-to-end data paths through the network, each path having a pre-determined delay and throughput.

When a call is originated, the Schedule Agent cooperates with the SSRs to create at least two paths 302, 303 from the caller 300 to the destination 307. The caller's local Switch A then sends duplicated data across each path 302, 303. The destination Switch C merges the duplicated data from the redundant paths 302, 303 and forwards a single, high-reliability data stream to the destination phone 307.

Each switch in the high reliability network (e.g., switches A, B, C, D) is a scheduled switch/router under control of the Schedule Agent 309. A scheduled switch/router operates by switching packets based upon a priori knowledge of when a packet will arrive and to what output port it should be switched. Redundant paths through a network can similarly make use of this sequencing of flows, and multiple calls can be handled on a transmission link by appropriately sequencing their presence so as not to collide (in time) with each other.

Once the redundant paths are defined and switching information distributed to the network switches A, B, C, D, the system receives information (such as packets) from the first phone and transmits two copies: one copy via each path to the second phone. The switch C at the destination end receives packets from both paths 302, 303, determines whether at least one copy of each packet has been received, and forwards a single copy of each packet to the destination phone 307.

For enhanced reliability beyond single redundancy, the Schedule Agent may also constrain the determination of the two paths 302, 303 such that they will traverse only physically distinct switches B and D and corresponding communication links, thus eliminating other single points of failure within the subnetwork. Additional paths may also be configured or reserved for simultaneous use or to use if one of the first two paths suffers an outage.

In an alternative embodiment of the invention, one or more of the end devices may comprise a fault-tolerant system 312 having multiple physical connections to the switching network. Under these circumstances, the Schedule Agent can be instructed to configure the redundant paths such that the destination switches 301, 310 are physically separate, where each switch is connected to the fault-tolerant end device 312. The end device 312 is then configured to receive redundant data from the redundant paths and to merge the data into a single, high-reliability stream. Similarly, the fault tolerant system 312 can be configured to generate multiple redundant streams itself, and the network configured to deliver them to a destination using redundant paths. This type of embodiment would further offload the network switches from the overhead required in the data duplication and path merge functions.

Known endpoints of the network system can be categorized, and appropriate policies can be set for each type, allowing a Schedule Agent implemented in accordance with the present invention to optimize the type and level of fault tolerance as a trade-off against available bandwidth. As a further feature of the illustrative embodiment of the invention, a data structure is created for each path that includes information regarding the particular links and switches upon which each path relies. Each switch in the high-reliability portion of the network signals the Schedule Agent if it detects that a portion of the path (i.e., a link or a neighboring switch) becomes non-operational. According to its configuration, the Schedule Agent can then identify which high-reliability paths will be affected by the outage, and can attempt to establish further redundant paths between the two end devices.

Through the use of multiple divergent path setup and real-time monitoring for outages, a system implementing the invention can take advantage of the extremely high reliability derived from parallel redundancy to overcome the poor fault tolerance inherent in existing failover and hot standby systems. There is essentially no switchover delay because the redundant data will arrive at the destination switch at approximately the same time in each path.

Furthermore, the loss of availability of the failed path can be minimized by defining multiple redundant paths, either at call initiation or as a redundant path is diagnosed with an outage.

Another advantage of the present invention is the selection of switches for each path such that the redundant paths will not traverse the same physical subnetwork. Those skilled in the art will recognize that such considerations are necessary to achieve the highest level of fault tolerance known as "disaster tolerance."

As yet a further advantage, high-reliability switching paths can exist simultaneously with traffic traversing normal paths, and normal traffic can be carried in the unused time slots configured for high-reliability traffic.

This invention solves the problems of system availability as indicated in the previous section. The invention described herein is a pre-failure, pro-active technology intended to completely mask faults, or increase the reliability of network paths to at least match that of the end devices. It also takes advantage of the scheduled nature of a scheduled switch/router and the availability of a centralized Schedule Agent. Because the switch operates in the time domain, it is possible to implement redundant hardware paths through the network that are also based in time. The Schedule Agent provides extraordinary facilities to adjust the level of fault tolerance for an unlimited number of operating scenarios.

One major advantage of the present invention is that redundant paths can be dynamically configured on a dynamic, appointment-by-appointment basis rather than on a static and permanent basis. This is a unique approach to fault tolerance as it eliminates a substantial amount of the financial penalties normally attributed to redundant fault tolerant architectures. Because the redundancy is appointment-time based, it can be configured to exist for a period of time and then dissipate.

State-of-the-art fault tolerant systems have permanent hardware redundancy that adds cost but does not add performance. In some cases, it may reduce performance. A system implementation of the present invention adds redundancy only when needed, taking the extra (redundant) hardware away from total available bandwidth on a temporary, per-call basis. This invention gives the network manager or application developer maximum flexibility in the utilization and protection of resources and data. Those skilled in the art will appreciate that the present invention can also be configured to provide redundant path services having characteristics equivalent to the static and permanent facilities prior art.

Another advantage is that the level of redundancy can be varied depending on the intended use of the network path. Thus, with support from the hardware, an embodiment of the present invention can be configured to set up triple redundant paths just as easy as setting up dual redundant paths. Again, bandwidth is only being borrowed for a period of time, for selected connections, rather than burdening the system with permanent redundancy for dedicated connections.

A further advantage of the present invention is that the Schedule Agent can be made aware of the type of end device that is requesting a scheduled path through the network as well as the number of links necessary to complete the path. This is important because both characteristics ultimately determine the necessary level of fault tolerance that should be configured for the network path. For example, a normal packet telephone itself has no inherent fault tolerant features so, except for occasionally establishing an ultra-reliable connection to the other telephone, it is of limited value to have a hard redundant network path permanently configured in the switch. Also, since a Schedule Agent implementing an embodiment of the present invention will know the number of links necessary to complete the path, it can determine the appropriate level of redundancy necessary to match or exceed that of the end devices.

In contrast, a synchronized redundant fault tolerant computer with redundant network interface cards is of little value without a redundant fault tolerant network. A Schedule Agent configured according to the present invention will have all of the necessary information to provision the appropriate path as well as pre-schedule and harden (make redundant) the potential failover over (shadow) path that may be used by the fault tolerant computer should it need to switch paths due to a failure. This represents a pro-active construction of failover path in anticipation of a failure in the end device.

Another feature of the illustrative embodiment is the efficient support of CALEA traffic. As described above, redundant scheduled paths can easily be defined between two end-points in the scheduled network. For CALEA, the scheduling of redundant paths is similar, except that one path reaches the subscriber's device and the redundant path reaches the LEA collection device. In theory, a raw copy of the copied data could be provided via the scheduled LEA path; however, the interim CALEA standards require transmission of additional information. Thus, in addition to spawning redundant scheduled routes and copied packets, a CALEA implementation provides a conforming "wrapper" to include surveillance identification information as well as the destination address of the LEA server. Where multiple LEAs may be monitoring the same subscriber stream, multiple redundant paths can easily be configured, each with a separate destination, and each isolated from the others.

Furthermore, unlike a typical network, each path is comprised of scheduled time slots for each hop. Therefore, the scheduled packet delivery for CALEA implementations according to the illustrative embodiment of the invention will not encounter packet losses caused by congestion. In fact, each CALEA path in the scheduled network can also be provided with redundant and independent paths for the highest reliability of data delivery to the LEA. Similarly, where the surveillance subject transmission has been branched for the subscriber's needs, each redundant path can also be monitored, copied, and merged for delivery to the LEA with little additional overhead. Again, these configurations can be established and managed dynamically, as the needs increase or abate.

These and other advantages of the invention will be apparent to those skilled in the art, in view of the illustrative embodiments further described herein.

DETAILED DESCRIPTION OF THE INVENTION

Figure 1:
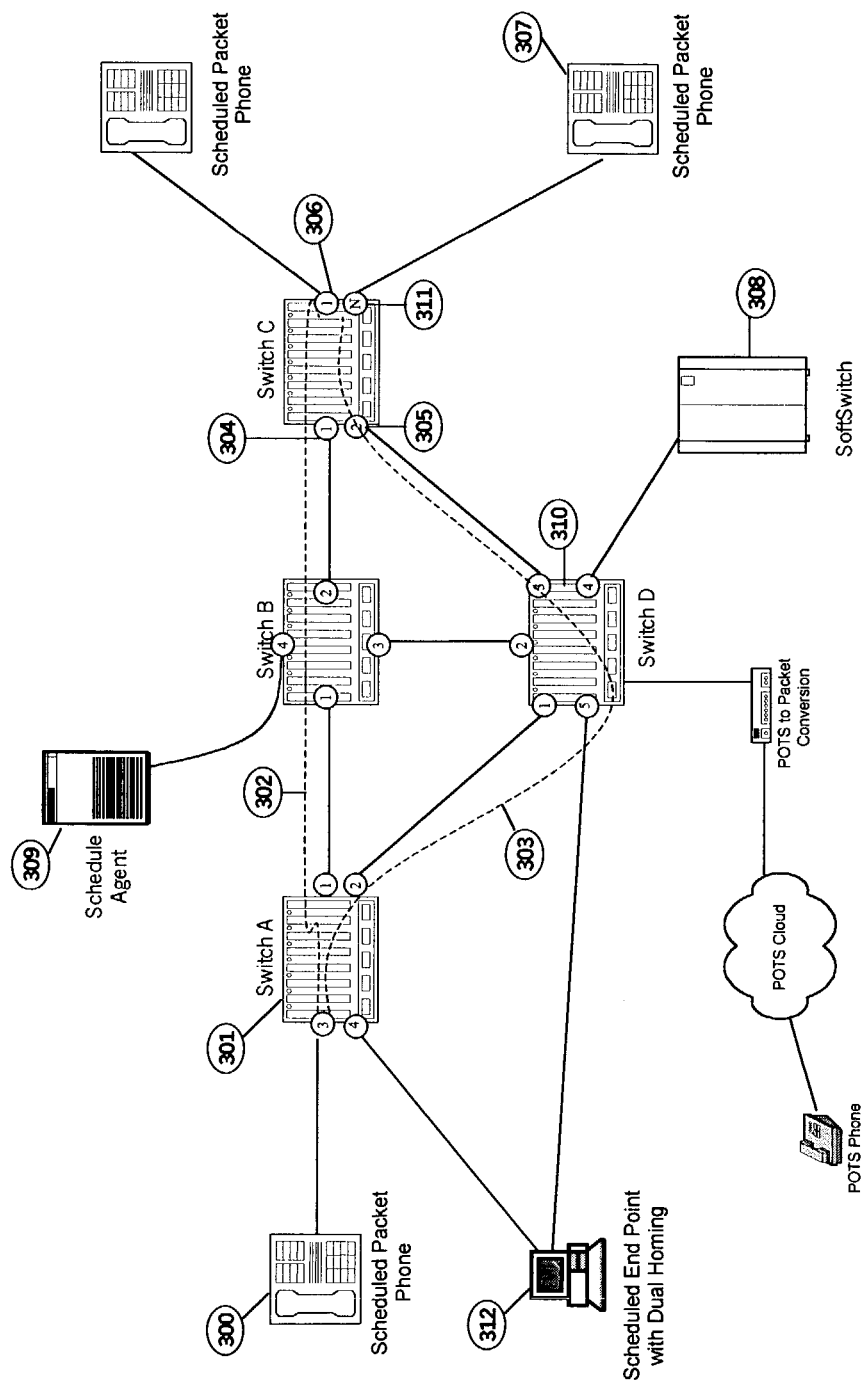
FIG. 1 illustrates a network incorporating elements of the illustrative embodiment of the present invention.

As shown in FIG. 1, illustrating an embodiment of the present invention, end devices 300, 307 are connected to a packet network comprised of one or more packet switches A, B, C, D, known as scheduled switch/routers (SSRs). Each SSR comprises a functional implementation equivalent to that of a NETWORK SWITCH WITH PACKET SCHEDULING, as more fully described in the co-pending '744 application incorporated herein by reference. The packet network also includes a real-time schedule server 309, also called a Schedule Agent, which is configured to receive network connection requests from the end devices, establish a network itinerary for each required path through the network, and communicate scheduling information to the end devices and respective switches along each path. Other features of the Schedule Agent are described more fully in the co-pending '744 application incorporated by reference herein, in which the Schedule Agent is referred to as a "schedule server", and the functional equivalent of an "itinerary is referred to as a "schedule" or "scheduled packet flow."

A user originates a call by transmitting a destination address number from the phone 300 to the local Switch 301, which forwards it to a Softswitch 308. Call information is sent to a Schedule Agent 309. The Schedule Agent 309 generates the necessary switching control information for data to be communicated along two paths 302 and 303. The switching information is sent to each associated Switch A, B, C, D, located along the corresponding paths 302, 303 from the caller to the destination, thus establishing an itinerary for data to be sent and received across each path in full duplex mode. Within the bounds of cost, space, and system performance, there may be an arbitrary number of switches in the network, with multiple interconnecting paths between switches, a number of possible redundant paths for the same flow, and any number of intervening switches required for each selected path.

Figure 2:
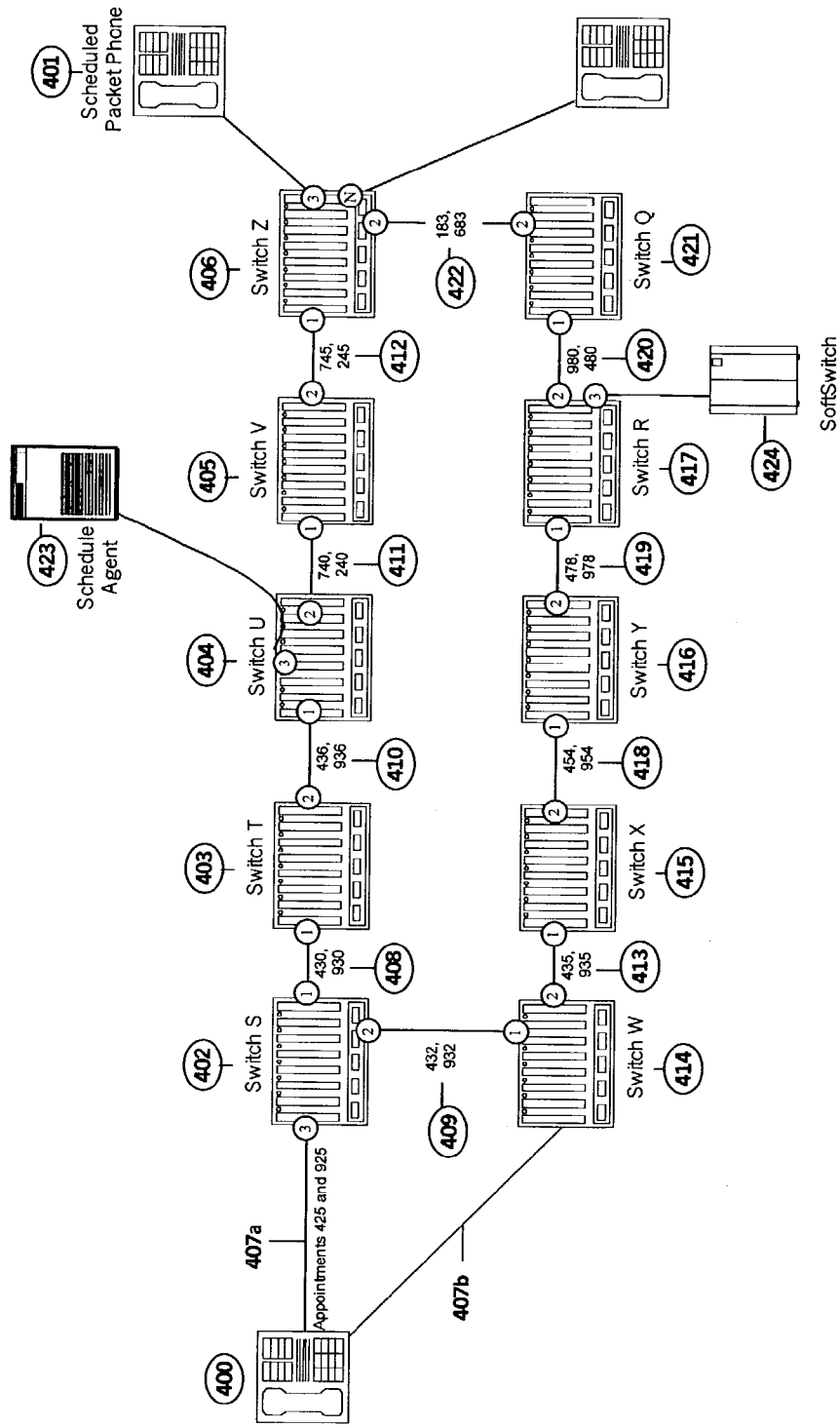
FIG. 2 illustrates an example of an architecture implementing an embodiment of the invention for dual paths.

Referring to FIG. 2, a call is placed from a phone (400) connected to Switch S (402) to a phone (401) connected to Switch Z (406). The call is requested or configured to be a Branch and Merge call with the branch occurring at Switch S (402) and the merge at Switch Z (406). For simplicity of discussion, the following example illustrates the operation of a half-duplex path. The operation to construct the return path and the return redundant path from the destination telephone is identical. As will be apparent to those skilled in the art, some communication protocols require full duplex operation (e.g., for acknowledgements), while others do not (e.g., streaming video), and the present system can accommodate redundant paths for either or both types of protocols simultaneously.

An illustrative embodiment of the present invention provides for the implementation of additional rules in the Schedule Agent, beyond those already described for operation of the "schedule application" of the "schedule server," in the co-pending '744 application. In particular, there are additional requirements to define path combinations that will not exceed latency restriction tied to maintaining properly sequenced output packets.

The following requirements must be met:
1. The system shall ensure that packet spacing is maintained within a specified or configured limit, so as not to add jitter to the application flow.
2. The system shall ensure that sequence order of packets is maintained, such that no packets arrive at the destination out of order.
3. The system shall ensure that overall delay through the network is within the limits specified or configured for the application.

In a preferred embodiment of the present invention, there are two rules that would be observed in order to meet the above requirements.

Rule 1: the difference in total latency of each path from the branch switch to the merge switch must be less than the minimum inter-packet transmission spacing of the scheduled data flow. For example, a scheduled data flow with 200 packets per second, with evenly spaced packets, will have a minimum inter-packet transmission spacing of 5 milliseconds for that flow. It should be noted that the packets need not be evenly spaced or periodic, but if evenly spaced, the minimum inter-packet spacing would be maximized.

Rule 2: The exit appointment of the merge switch shall satisfy the appointment latency of the latest (in time) of the arrival appointments, but it must also be less than the appointment latency calculation for the next packet (in time) on the earliest branch. In other words, the exit appointment of the merge switch must occur after the arrival of the latest branched packet, but it must also be less than the arrival time of the next packet on the earliest branch. An explanatory example is provided below.

The Schedule Agent keeps a complete record of the entire topology of the network under its control, and controls and monitors all paths and calls throughout the network, and uses this knowledge to create paths between end points that meet the requirements of Rules 1 and 2, releasing these paths when the corresponding call terminates. An "itinerary" is the complete end-to-end flow schedule for the path a data flow traverses. Each itinerary's definition includes SSR input and output ports as well as the appointment number (time) at which each packet arrives and departs from an SSR.

The following is an example of the latency calculations and comparisons, referring to FIG. 2. It is assumed, for illustrative purposes only, that there are 1000 appointments per schedule period, and that the originating phone sends one packet every 500 appointments. Therefore, the minimum inter-packet transmission spacing for that flow is 500 appointments. A Branch and Merge path is requested or pre-configured for a flow from the originating phone (400) to the destination phone (401). The Schedule Agent determines a path between Switch S (402) and Switch Z (406). After calculating a path that meets the requirements of Rules 1 and 2 (above), it communicates the path information to all devices along each segment of the branched and merged path (including the end points). In this example, the Schedule Agent (423) instructs phone 400 to send its traffic on appointment numbers 425 and 925 (407a). Switch S is instructed by the Schedule Agent to branch the call into two branches, Branch 1 and Branch 2, with Branch 1 having outgoing appointments of 430 and 930 (408) and Branch 2 having outgoing appointments of 432 and 932 (409).

Branch 1 then traverses switches T, U. V and Z. The itinerary for packets on Branch 1 traverses a short link to Switch T (403) where it exits on appointments 436 and 936 (410), and then it traverses a link with a propagation delay of 304 appointments to Switch U (404) where it exits on appointments 740 and 240 (411). Note that the appointment calculation is modulo 1000 since the schedule period is 1000 appointments. Thus the second packet's calculation is 936+304=(1240 modulo 1000)=240

It next travels across another link to Switch V (405) where it departs on appointments 745 and 245 (412) on a short link, with a total delay just five appointments, to merge Switch Z (406).

Branch 2 exits Switch S and then traverses switches W, X, Y, R, Q and Z. The itinerary for packets on Branch 2 traverses a short link to Switch W (414) where it exits on appointments 435 and 935 (413), and across a relatively short link to Switch X (415) where it departs on appointments 454 and 954 (418), then another relatively short link to Switch Y (416) where it departs on appointments 478 and 978 (419). It then departs across a long link (propagation delay 502 appointments) to Switch R (417) where it departs on appointments 980 and 480 (420). Note that the second packet appointment has also wrapped around the scheduled period, and can be thought of as (1480 modulo 1000), or 480, once again because the system in this example has a schedule period that repeats every 1000 appointments. The branched data flow then travels across a link with a propagation delay of 203 appointments and arrives at Switch Q (421) where it departs on appointments 183 and 683 (422). Note again that the first packet has undergone the modulo calculation, where we have 980+203= (1183 Modulo 1000)=183. Finally, the Branch 2 packet travels a short link, with a propagation delay much less than one appointment, to the merge Switch, Z (406) on appointments 183 and 683.

In this example, the total appointment latency of Branch 1, packet 1 is 745−425=320 appointments while the second branch is 1245−925=320 appointments as well. The total appointment latency of Branch 2 packet 1 is 1183−425=758 appointments and Branch 2 packet 2 is 1683−925=758 appointments. Important here is that fact that the total appointment latency for some calculations (those that exceed the modulo schedule time) must include the schedule period time, which equals 1000 appointments in this example, so 1183—not 183—is used.

In this example, the difference in total appointment latency is:

(Branch 2 latency)−(Branch 1 latency)=(758−320)
=438 appointments

This meets the requirement of Rule 1 as indicated earlier, since in this example, the originating application transmits one packet each 500 appointments.

To meet the restriction of Rule 2, the outgoing appointment of Switch Z (406) must be scheduled by the Schedule Agent (423), to be equal to or greater than the appointment time of Branch 2 (in this case, greater than 183). Also, the outgoing appointment must be less than the Branch 1 appointment for the next packet into Switch Z, which is appointment 245 (412). If the outgoing appointment were greater than 245 or less than 184, Rule 2 would not be satisfied and the merged packets would be out of sequence. This situation is avoided by appropriate pre-scheduling by the Schedule Agent, where the path to the merge point is managed by choosing a path with different latency characteristics, and testing to determine if the path meets Rules 1 and 2.

One other point is important to note here. The redundant system and call setup would work also correctly and efficiently if the phone were dual homed, and the phone performed the branch function, instead of Switch S (402). For example, if a data link 407b between Phone 400 and Switch W (414) existed, the phone could perform the branch function, transmitting duplicate packets over both of its links 407a, 407b. In this case, Switch S (402) would not perform the Branch and duplication function, and would thus not transmit over (409). The Phone (400) would transmit to Switch S (402) on one set of appointments assigned by the Schedule Agent (423) and would transmit to Switch W (414) on another set of appointments set up by the Schedule Agent. The analysis of the transmission paths would be performed identically to the preceding analysis. The two rules would still be used to ensure proper packet sequencing on the network, and scheduling would be used to ensure proper delivery of the data. Those skilled in the art will also recognize that phone 401, if properly configured, could provide the merge function instead of Switch Z (406). Also notice that there is no requirement that either the Branch Point or the Merge Point be dual homed. However, one aspect of a preferred embodiment of the invention is to use dual or multi-homed devices for the Branch and Merge points to ensure the highest level of reliability and availability of the system.

Figure 3:
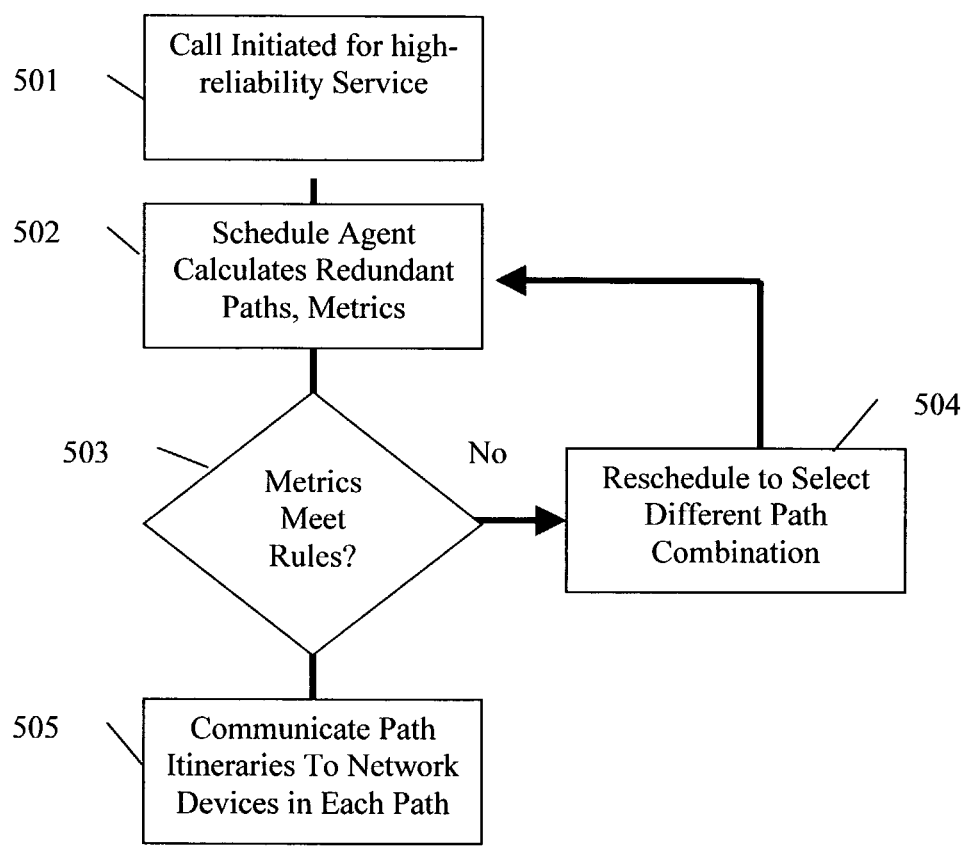
FIG. 3 is a flow diagram for the branch setup procedure by a Schedule Agent in an embodiment of the invention.

A Scheduled Switch/Router (SSR), specifically configured to support branching in the illustrative embodiment, performs the Branch Function on data flows identified as those needing either full Branch and Merge, or Branching only. FIG. 3 shows a summary of functions for the Schedule Agent. As shown in FIG. 3, a call is initiated for Branch and Merge service (501). The Schedule Agent then creates the necessary itineraries for each path (502), using the necessary latency metrics. If the metrics do not meet the requirements of Rules 1 and 2 (503), the Schedule Agent is tasked to create a new itinerary combination (504). Each combination is tested until one is found that satisfies Rules 1 and 2 (503). The flow schedule itineraries are then communicated (505) to the devices along each path, as described in the co-pending '744 application.

Figure 4:
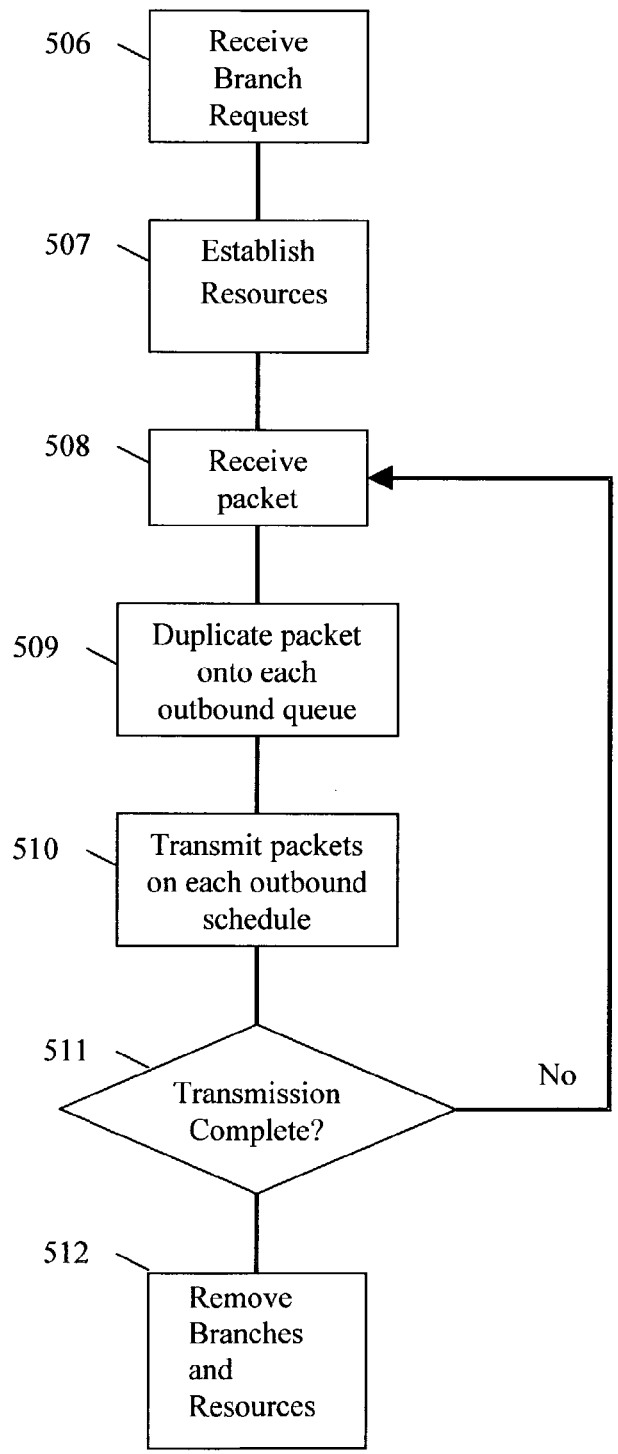
FIG. 4 is a flow diagram for the branch setup procedure by a Scheduled Switch/Router (SSR) in an embodiment of the invention.

Refer to FIG. 4 for illustrative Branch functions in an SSR configured according to an embodiment of the invention. The SSR waits for a command from the Schedule Agent. When the SSR receives a branch command (506), it sets up the resources it needs to satisfy the branch request, including transmission queues, packet memory, and other resources (507). The SSR then enters a loop where it waits for packets to arrive (508). When a data packet arrives (508) in the SSR that will perform the branching function, the packet is duplicated (509), with each replicated packet going to the various designated outbound network ports. The branching SSR, and each SSR along the path, then treats each replicated packet as if it were an entirely separate and unrelated data flow. Each branch has its own transmission times, egress ports, and scheduled paths that it will follow. This branch operation of receive (508) and copy (509) is carried out for each packet, until the flow terminates (511).

Figure 5:
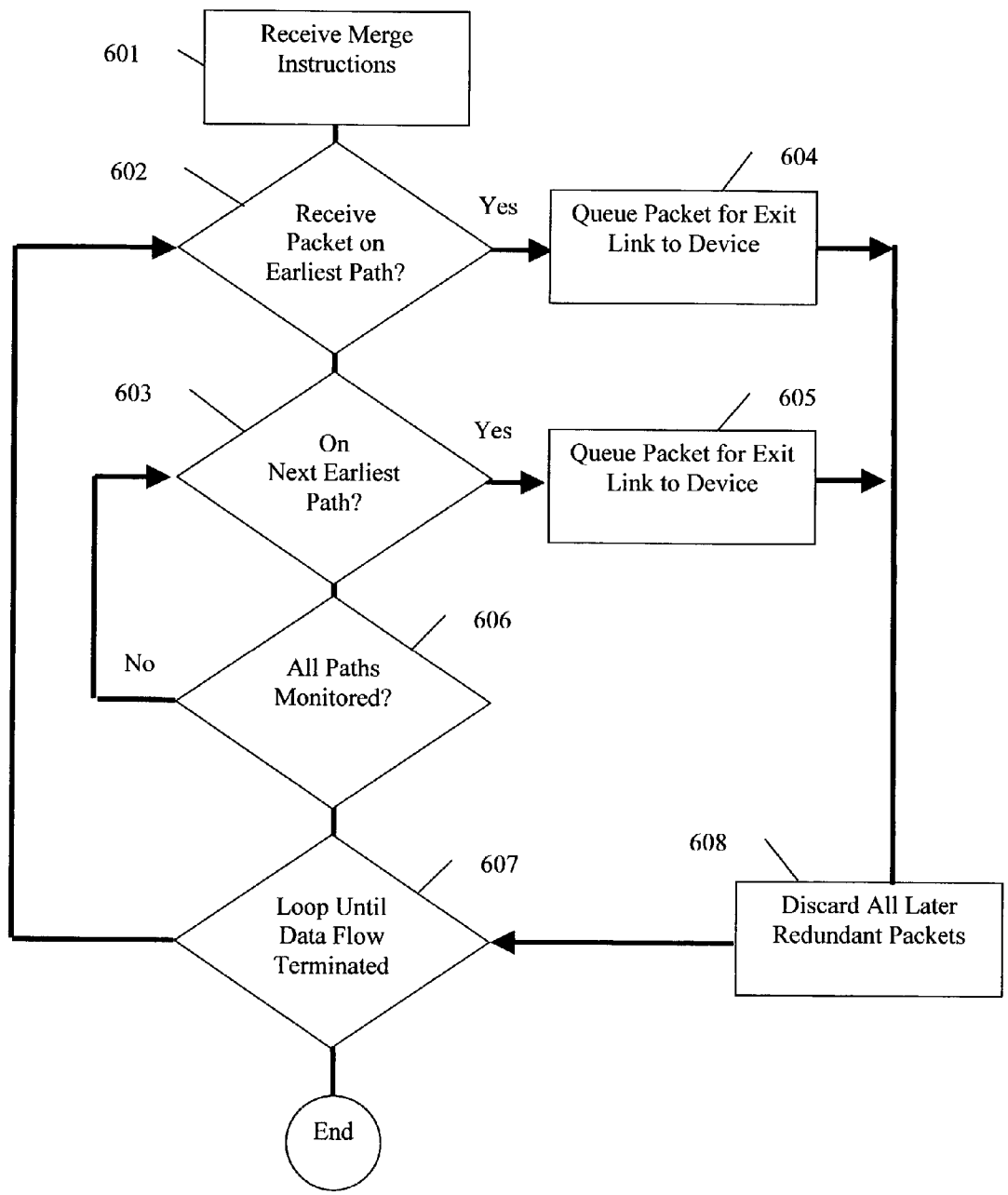
FIG. 5 is a flow diagram for the merge procedure in an embodiment of the invention.

When the paths reach Switch Z (406) where they merge, additional processing is required for determination of which copies to forward and which copies to discard. The merging function requires a Merging Capable SSR, i.e., a scheduled switch/router modified in accordance with the illustrative embodiment. As shown in FIG. 5, each switch can be configured with the necessary facilities, and then activated by instructions sent (601) from the Schedule Agent. The merging SSR monitors all paths and schedules that are being merged. During normal operations, the merging path that arrives earliest in time is the source of the merged data. When a packet arrives (602) on the earliest branch, it is sent (604) to the transmission port where it will await its outbound appointment. Packets that then arrive on all of the other branches (the redundant packets) will be discarded (608) by the SSR.

If no packet arrives at the earliest branch (602), the next earliest branch is monitored. If a packet then arrives on this next earliest branch (603), all other redundant packets (if any) are discarded (608) and this packet is forwarded (605) on to the destination. If no packet arrives on this branch (603), the next merging branch (if any) is monitored (606). It is possible that no packet will arrive due to the fact that none was transmitted. Therefore, lack of a packet does not necessarily indicate a system wide problem.

One skilled in the art will appreciate that the pre-determined time interval between the first branch arrival appointment and the last latest arrival appointment can be significantly shorter than limit required by Rule 1. For example, the merge switch can be configured to wait for packets for 40 appointments between first and last branch, even though the latency of each branch is much greater.

After a packet has been processed, or all branches have been monitored and found to not contain data (606), the earliest branch is again monitored (602) to look for the next packet. This process continues until the data flow is terminated (607).

There are at least four types of redundancy that can be used to construct reliable scheduled paths, according to the illustrative embodiment:
1. Redundant paths with both branching and merging functions in the network.
2. Redundant paths with the branching function in the network and the merging function in the end points.
3. Redundant paths with the branching function in the end points and the merging function in the network.
4. Redundant paths with both branching and merging functions in the end points.

If either the branching function or merging function is in the end point, then the end point should be capable of having redundant network interface cards as well. For example, a Dual Modular Redundant Fault Tolerant computer or a Triple Modular Redundant computer can have each of their two or three network interface cards connected to one of the redundant paths in the switch.

An illustrative embodiment of the invention, when configured to create a high-reliability path, performs the branching and merging functions in the network when an end device has only one (non-redundant) network interface path into the switch. To increase the reliability of a long path, one or more redundant paths are created as soon as the data enters the switch. When the paths approach the switch attached to the other end device, the data is merged back to a single path. Branch and merge can be easily and dynamically configured or removed for specific connections or devices, as needed.

The disclosed illustrative embodiment has an additional function to allow systems to benefit from enhanced reliability and flexibility. An End Point device may request or be configured to have non-intersecting paths to selected destination devices. The Non-Intersection Path function creates two or more data flow paths, which do not intersect in any switch in the network. This function can be used with any combination of branching and merging in the network or in the end points, such that high-reliability paths do not share physical resources within the network. Alternatively, the network parameters can also be defined to permit a limited number of path intersections, such as where fault-tolerant subsystems occur within the network, or where a subscriber's needs are less stringent than would justify fully independent paths.

Since each branch is treated as a separate data flow once the packet has been replicated in the branching SSR, the data flows can also terminate at entirely different end points. Thus, the invention can perform legal intercepts at a monitoring point in the network for Law Enforcement as readily as data redundancy branching. Unlike any prior art, a monitoring point according to the present invention can be configured at any point in the scheduled data path, and performs monitoring of any data arriving during the predetermined appointment to be monitored at that point. Unlike the prior art, the SSR monitoring does not require any specialized wiretapping hardware, and does not incur the processing overhead of having to filter data packets based upon sending or receiving address fields.

With the standard branch and merge, the entire packet (including the packet header) is duplicated and forwarded. The only difference the duplicated packets experience is that they traverse different scheduled itineraries up until the merge point. In the monitoring configuration, the merge function is omitted from the instructions to the switches. In one case duplicate packets are discarded, and in the alternative case, the duplicate packets are transmitted to one or more predetermined end points.

Figure 6:
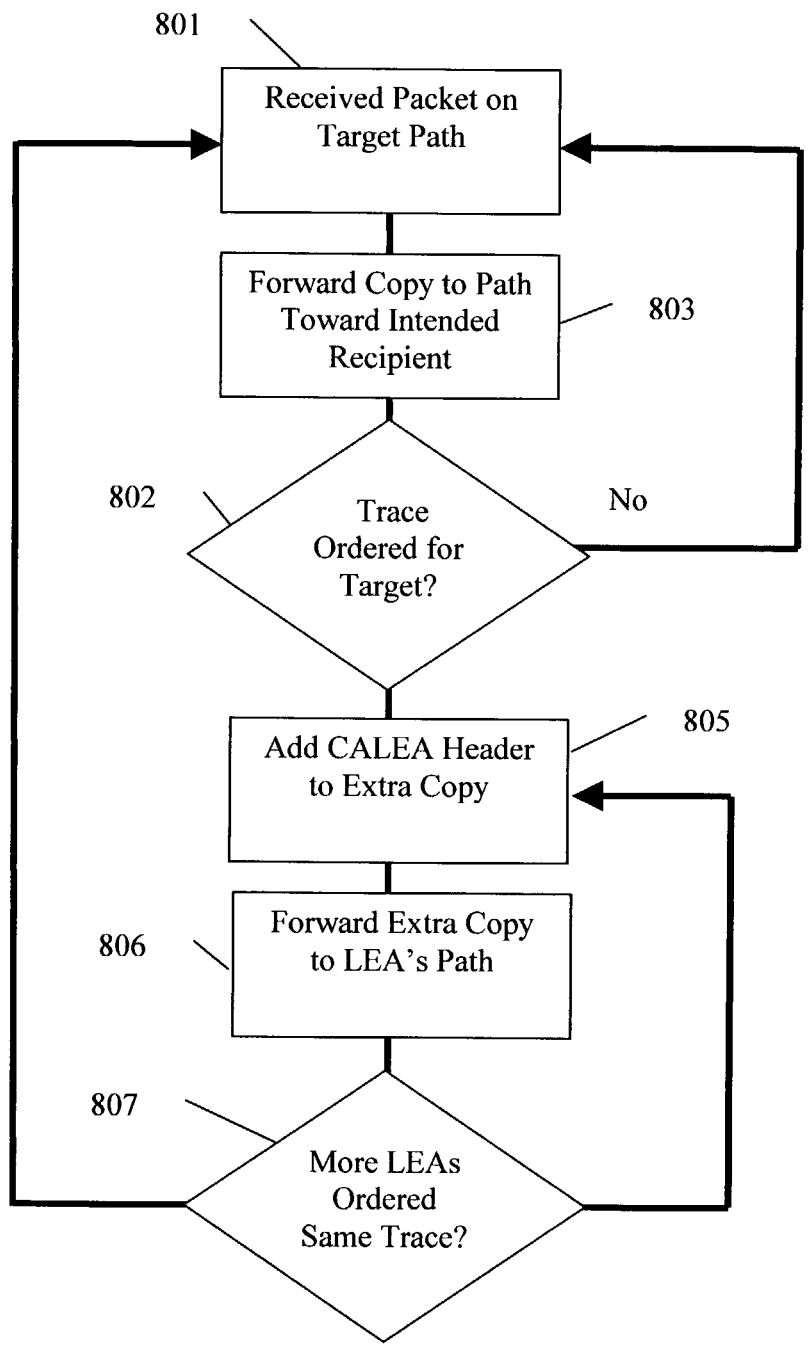
FIG. 6 is a flow diagram for a CALEA procedure in an embodiment of the invention.

To support Law Enforcement's requirements for legal intercepts, the destination of the end point to which the legal intercept is transmitted, and thus the destination packet address, is different from the packet address of the original packet flow. With legal intercepts, a copy of each original packet must be delivered in its entirety to ensure the evidentiary validity of the packet. In addition, there must be some identifying data added to the packet to ensure the packet has been obtained and processed according to a proper court order. Therefore, the duplicated packet must be enclosed in a "header" which identifies the trace being performed and a new packet header with a destination packet address corresponding to an information-gathering server, such as a CALEA delivery server. Thus, referring to FIG. 6, the CALEA steps are:
1. Receive the packet (801) and identify it as the target of the trace (802).
2. Duplicate the packet exactly.
3. Place one copy on an itinerary such that the original recipient will still receive the packet (803).
4. Place a CALEA header on the packet that indicates the court order/trace identification information for this packet (805).
5. Place a new packet header on the packet that contains the CALEA Server as the destination address (805).
6. Insert this CALEA packet on the itinerary destined for the CALEA server (806).
7. If there is more than one Law Enforcement Agency performing surveillance on this subject, repeat (807) steps 4 to 6 for each agency end point that will receive this data.

An implementation of the invention that supports packet monitoring takes advantage of the ability of the scheduled switch/router to duplicate a packet one or more times and send that packet over different itinerary paths to one or more destinations. Those with skill in the art will notice that the itinerary path can be a path that is entirely separate from the path a normal packet router or switch may use. This allows the system to determine the best route for each flow and each part of a flow, thereby ensuring proper performance characteristics for that flow.

Note that these two types of functions are not mutually exclusive. For example, a redundant flow could be the target of Law Enforcement surveillance, thus the flow would experience both a branch and merge function as well as a CALEA branching function.

One of skill in the art will appreciate that an SSR at a branch point or a monitoring point can be adapted such that each scheduled packet flow can be propagated with or without additional processing at the branching point, such as changing a destination address in each packet, or adding new information, such as other identifying information, to the packet before forwarding it, or other modifications as may be desirable for some or all packets, and for some or all redundant flows (e.g., filtering, tagging, reformatting, etc).

During operation of a scheduled packet network, it is possible (and given enough time, likely) that an error condition could arise on one of the various branched paths. For example, a data link could stop data transmission due to wire cuts, an SSR could be halted for service or upgrade, a power outage could remove one or more segments of the path, or any of a number of other error conditions could manifest.

Figure 7:
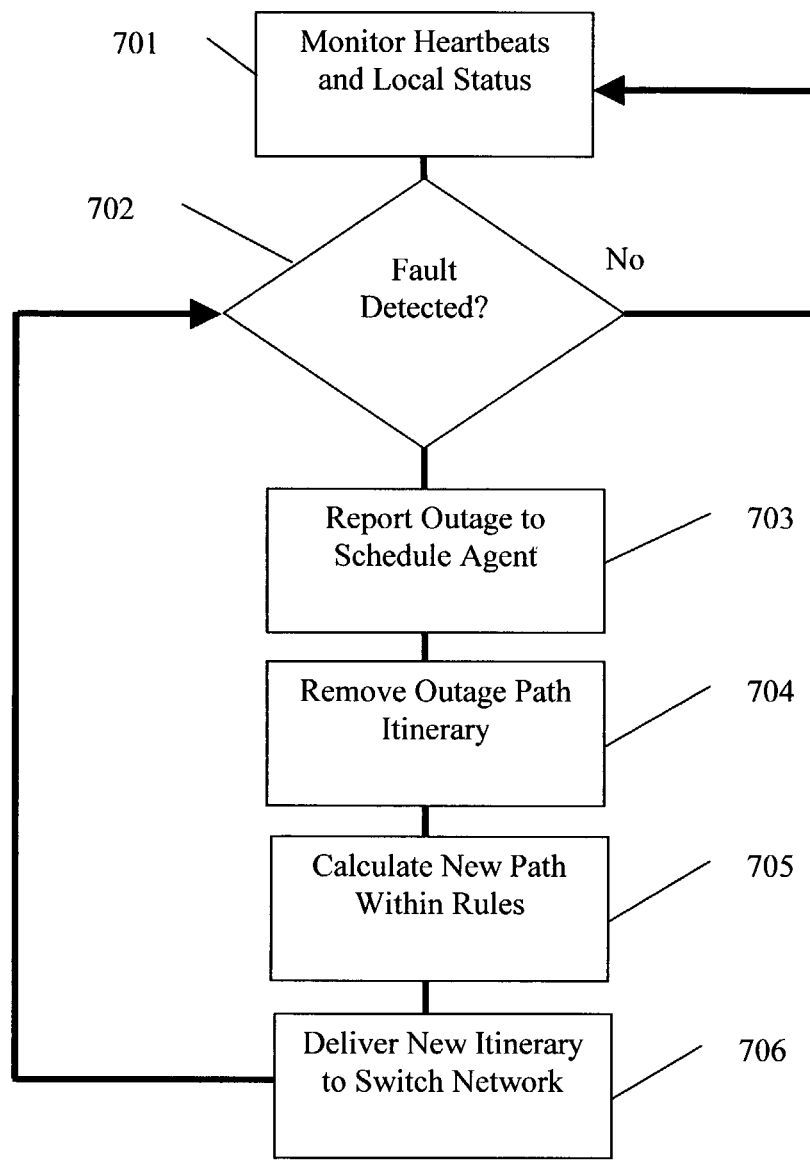
FIG. 7 is a flow diagram for a fault detection and correction procedure in an embodiment of the invention.

Each SSR in the network exchanges "heartbeat" messages with its neighbors, as further described in the co-pending '744 application, as well as monitoring their own interfaces (see FIG. 7, 701). Each scheduled path is made of numerous segments having communication links and interface devices. When a path segment is lost, those SSR systems adjacent to the lost segment detect the fault (702) and report the service interruption (703) to the Schedule Agent. The Schedule Agent will inform the SSR systems along the path of the loss of the data flow, and remove (704) this itinerary from the redundant flow. Note that the uninterrupted path remains fully operational and is not affected by the Schedule Agent. The Schedule Agent will next calculate (705) a new redundant path (a substitute) to replace the one lost. The Schedule Agent delivers the new itinerary (706) to the SSR systems along the path. Also, as part of the delivery (706), the Schedule Agent informs the branching and merging SSR systems of the change. The branching system will now send one of the duplicate packets over the new itinerary while the merging system will add the new itinerary to its monitor list.

Those knowledgeable in the art of redundant systems will recognize that being able to rapidly replace an unavailable element in a system further improves overall system reliability. For example, consider a system with an availability of 99%. That means there are 5256 minutes per year that the system is unavailable. This may mean that there are 5 events per year, with each event requiring about 1050 minutes to restore service, or it could be 50 events per year, with each event requiring 105 minutes to restore service. In addition to availability, it is also useful to determine what the probability is of a failure event occurring during a given time period. This probability is calculated from:

$$P(t) = E/N$$

Where P(t) is the probability of the event occurring in a given time period—t. E is the number of events that occur during a year, while N is the number of time periods in a year. As an example, consider a pair of 0.99 devices that have 50 outage events per year, each lasting 100 minutes. One can then calculate the probability of having a both devices experiencing an outage at the same time by finding the probability of an outage of the second device during the 100-minute timeframe of the first device's outage. Thus, the probability of a complete system failure is given by:

$$P(100 \text{ minutes}) = 50/5{,}256 = 0.95\%$$

Now, consider the improvement in system failure probability if an element can be replaced more rapidly with a new element. In the discussion of the illustrative embodiment of the invention, a lost data path is replaced within seconds by a new data path. Even though it may take minutes, hours or even days to replace an SSR, lost power, or a severed data link, the Schedule Agent can detect and replace a lost itinerary segment in seconds. Now, even with the same 0.99 availability devices, replacing a lost segment in 10 seconds instead of 100 minutes changes the probability of simultaneous failure to:

$$P(10 \text{ seconds}) = 50/3{,}153{,}600 = 0.0016\%$$

Therefore, the use of the complete invention (Schedule Agent and redundant paths) and standard reliability SSR systems (99% available systems) will improve reliability many hundreds of times over that of a simple redundant path system. In fact, using the Schedule Agent to control and monitor the network brings the reliability of a branch and merge data flow into the near 0.99999 availability reach without the excessive expenses of high availability hardware and software.

While the invention is described through the above illustrative embodiments, it will be understood by those of ordinary skill in the art that modification to and variation of the illustrative embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:
1. A computer-implemented method comprising:
calculating, by a computer device, a plurality of paths within a data packet network from a branch point to a merge point, wherein a combination of said plurality of paths meets predetermined configuration requirements;
transmitting a copy of each packet received at said branch point along at least two of said plurality of paths;
merging data received from said plurality of paths at said merge point into a single data stream, said merging including monitoring each of said plurality of paths for a predetermined interval for each packet, and forwarding only the first packet of said transmitted copies of said packet to arrive on any of said plurality of paths during said interval;
varying a level of redundancy for selected connections;
wherein said calculating, said transmitting, said merging, and said varying are done on a temporary, per-call basis for Voice Over Internet Protocol (VOIP) data within said data packet network and wherein said calculating, said transmitting, said merging, and said varying are not done on other types of data within said data packet network;
monitoring the status of at least one of said plurality of paths;
determining when said at least one monitored path has experienced an outage;
requesting a calculation of a substitute path meeting said predetermined configuration requirements; and
using said substitute path for transmitting further copies of each packet from said branch point to said merge point.

2. The method of claim 1 in which said data packet network is comprised of one or more scheduled switch/routers (SSR).

3. The method of claim 1 in which segments of said plurality of paths can be used by normal traffic during intervals when no scheduled packets are being transmitted over said segments.

4. The method of claim 1 in which said predetermined configuration requirements include a requirement that at least two of said plurality of paths do not share common communication facilities within said data packet network.

5. The method of claim 1 in which said predetermined configuration requirements include a requirement that the difference between latency times of each of said plurality of paths does not exceed a pre-configured limit, whereby the packets of each path remain in sequence.

6. The method of claim 1 where said predetermined configuration requirements include a requirement for scheduling transmission of said single data stream at a time no earlier than a latency time of the shortest path of said plurality of paths and at a time no later than a latency time of the longest of said plurality of paths, wherein said latency times are calculated between said branch point and said merge point.

7. The method of claim 1 in which at least one of said branch point and said merge point is located within said network.

8. The method of claim 1 in which at least one of said branch point and said merge point is located within a device connected to said data packet network.

9. The method of claim 8 in which said device is a multi-homed device connected to said data packet network at a plurality of access points, and said device is configured to perform a branching function or a merging function or both.

10. The method of claim 1 in which a schedule agent is configured to receive a request for one or more high-reliability data paths, and to calculate said plurality of paths according to topology and latency information known to said schedule agent.

11. The method of claim 1 in which resources for said plurality of paths are released for use by other paths when highly reliable paths are no longer required between said branch point and said merge point.

12. The method of claim 1 wherein said data within said data packet network includes VOIP data and at least one of the group consisting of email, web pages, and file transfers.

* * * * *